US011326878B1

(12) United States Patent
Staley, II (10) Patent No.: US 11,326,878 B1
(45) Date of Patent: May 10, 2022

(54) DISTANCE MEASURING METHOD AND SYSTEM FOR AERIAL DEVICE

(71) Applicant: Altec Industries, Inc., Birmingham, AL (US)

(72) Inventor: Earl G. Staley, II, Rineyville, KY (US)

(73) Assignee: Altec Industries, Inc., Birmingham, AL (US)

( * ) Notice: Subject to any disclaimer, the term of this patent is extended or adjusted under 35 U.S.C. 154(b) by 0 days.

(21) Appl. No.: 17/555,936

(22) Filed: Dec. 20, 2021

(51) Int. Cl.
*G01C 3/02* (2006.01)
*H04N 7/18* (2006.01)
*G01G 19/00* (2006.01)
*G01C 9/00* (2006.01)

(52) U.S. Cl.
CPC .............. *G01C 3/02* (2013.01); *G01C 9/00* (2013.01); *G01G 19/00* (2013.01); *H04N 7/183* (2013.01)

(58) Field of Classification Search
CPC .................................... G01C 3/02; G01C 3/06

USPC ............................................................ 356/3
See application file for complete search history.

(56) References Cited

U.S. PATENT DOCUMENTS

| | | | | |
|---|---|---|---|---|
| 6,202,013 | B1* | 3/2001 | Anderson | E04G 21/0436 701/50 |
| 7,472,009 | B2* | 12/2008 | Baldwin | E02F 9/264 701/50 |
| 7,984,557 | B1 | 7/2011 | Carl | |
| 9,677,335 | B2* | 6/2017 | Lenz, Jr. | E06C 5/36 |
| 10,527,413 | B2* | 1/2020 | Matsuo | H04N 7/181 |
| 10,974,702 | B2* | 4/2021 | Lackore, Jr. | E06C 5/18 |
| 11,047,681 | B2* | 6/2021 | Yuen | G01C 15/06 |
| 2020/0307967 | A1* | 10/2020 | Ishikawa | G01B 21/045 |
| 2021/0223778 | A1* | 7/2021 | Endo | G01S 17/89 |

* cited by examiner

*Primary Examiner* — George B Bennett
(74) *Attorney, Agent, or Firm* — Erise IP, P.A.

(57) ABSTRACT

A system and method for calculating an accurate distance from an aerial device to an intended target using a laser probe. A control system can further include a sensor system and at least one camera for measuring additional operational parameters and viewing surrounding obstacles. Sensors may include an inclinometer and a weight sensor.

20 Claims, 7 Drawing Sheets

DISTANCE MEASURING METHOD AND SYSTEM FOR AERIAL DEVICE

BACKGROUND

1. Field

Embodiments of the invention relate to systems and methods for calculating the distance between an aerial device and an intended target. More specifically, embodiments relate control systems including a laser to determine the distance of an intended target from an aerial device.

2. Related Art

Utility workers oftentimes utilize vehicles having aerial devices with boom assemblies to access targets that would otherwise be unreachable. In certain cases, utility vehicles must navigate into areas having large space to safely park the vehicle. However, once the utility vehicle is parked, it can be difficult for the operator to determine whether the aerial device will be able to reach an intended target, including for example a telecommunication node, transformer, amplifier, etc.

Currently, workers must visually estimate whether they have parked close enough to the intended target for the aerial device to reach. This can prove difficult, as oftentimes the location of telecommunication nodes or other targets vary in height relative to the ground and distance from the road. Further, oftentimes to resolve issues operators must travel to multiple nodes that are connected between towers. If the utility vehicle is parked correctly, a technician may be moved from one node to another while in the aerial device without requiring movement of the utility vehicle. However, if the distance estimation is off by even a few inches, the utility vehicle may have to be moved multiple times. Additionally, telecommunication nodes or other targets are oftentimes located in residential areas and parked vehicles and the surroundings around the utility vehicle must be taken into account on where to park the utility vehicle for operation.

Accordingly, an automatic alternative for estimating distances between a utility vehicle and a target for an aerial device is needed.

SUMMARY

Embodiments of the invention solve the above-mentioned problems by providing a system and method for calculating an accurate distance from an aerial device to an intended target using a laser probe. A control system can further include a sensor system and at least one camera for measuring additional operational parameters and viewing surrounding obstacles.

In some aspects, the techniques described herein relate to an aerial device, including: a base; a boom operatively attached to the base at a first end; a platform attached to the boom at a first end; a distance measuring system operatively coupled to at least one of the base, the boom, or the platform, including a laser targeting probe; and a control system operatively coupled to the distance measuring system, including: a display; and a controller for inputting a command to manipulate the laser targeting probe.

In some aspects, the techniques described herein relate to an aerial device, further including a protective housing surrounding the laser targeting probe.

In some aspects, the techniques described herein relate to an aerial device, wherein the laser targeting probe includes an emitter for emitting a laser.

In some aspects, the techniques described herein relate to an aerial device, wherein the laser targeting probe includes a camera for capturing an image.

In some aspects, the techniques described herein relate to an aerial device, wherein the image captured by the camera is configured to be displayed via the display.

In some aspects, the techniques described herein relate to an aerial device, wherein the laser targeting probe further includes a motorized turntable.

In some aspects, the techniques described herein relate to an aerial device, wherein the motorized turntable is configured to respond to the command from the control system.

In some aspects, the techniques described herein relate to a system for measuring a distance between an intended target and an aerial device, the system including: an aerial device including: a base, a boom operatively attached to the base at a first end, and a platform mechanically attached to the boom at a second end; a distance measuring system including: a laser targeting probe, a protective housing, and a control system, wherein the laser targeting probe includes a laser emitter and a camera, wherein the control system is configured to control an orientation of laser targeting probe through an image captured by the camera.

In some aspects, the techniques described herein relate to a system, further including at least one first sensor configured for recording sensor data and sending the sensor data to the control system.

In some aspects, the techniques described herein relate to a system, wherein the at least one first sensor is an inclinometer.

In some aspects, the techniques described herein relate to a system, further including at least one second sensor, wherein the at least one second sensor is a weight measuring sensor.

In some aspects, the techniques described herein relate to a system, further including at least one imaging camera operatively coupled to at least one of the base, the boom, or the platform.

In some aspects, the techniques described herein relate to a system, wherein the at least one imaging camera is configured for recording an image of an area around the aerial device.

In some aspects, the techniques described herein relate to a system, wherein the control system is configured to receive the image recorded by the at least one imaging camera.

In some aspects, the techniques described herein relate to a method of determining a distance between an aerial device and an intended target, the method including: positioning an aerial device including a base, an extendable boom having a platform, and a distance measuring system in a first position; identifying a first intended target and activating the distance measuring system; determining a distance between the first intended target and the platform; generating a determination on whether the platform can reach the first intended target; and displaying the determination on a display of the distance measuring system.

In some aspects, the techniques described herein relate to a method, further including identifying a second intended target and determining the distance between the second intended target and the platform.

In some aspects, the techniques described herein relate to a method, further including generating a determination on whether the platform can reach both the first intended target and the second intended target without repositioning the aerial device.

In some aspects, the techniques described herein relate to a method, further including receiving sensor data from one or more sensors in communication with the distance measuring system.

In some aspects, the techniques described herein relate to a method, wherein the one or more sensors include an inclinometer or a weight sensor, and further including recording the sensor data and sending the sensor data to the control system.

In some aspects, the techniques described herein relate to a method, further including monitoring an area around the aerial device via one or more imaging cameras in communication with the distance measuring system.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the technology can include a variety of combinations and/or integrations of the embodiments described herein.

Broadly, embodiments of the present invention are directed to a processor combined with at least a laser or other distance measuring apparatus, for determining a distance between an attachment for a utility vehicle and a target. By way of non-limiting example, the distance measuring device may be paired with a utility vehicle having an aerial device, the distance measuring device being configured for measuring the distance between the aerial device and telecommunication nodes located between telecommunication towers. However, the distance measuring device may be used with a variety of utility vehicles comprising many different utility vehicle accessories. For example, in addition to the aerial devices, the utility vehicle accessories or attachments may also comprise digger derricks, boom truck cranes, spray equipment, and augers, among other attachments.

Figure 1:
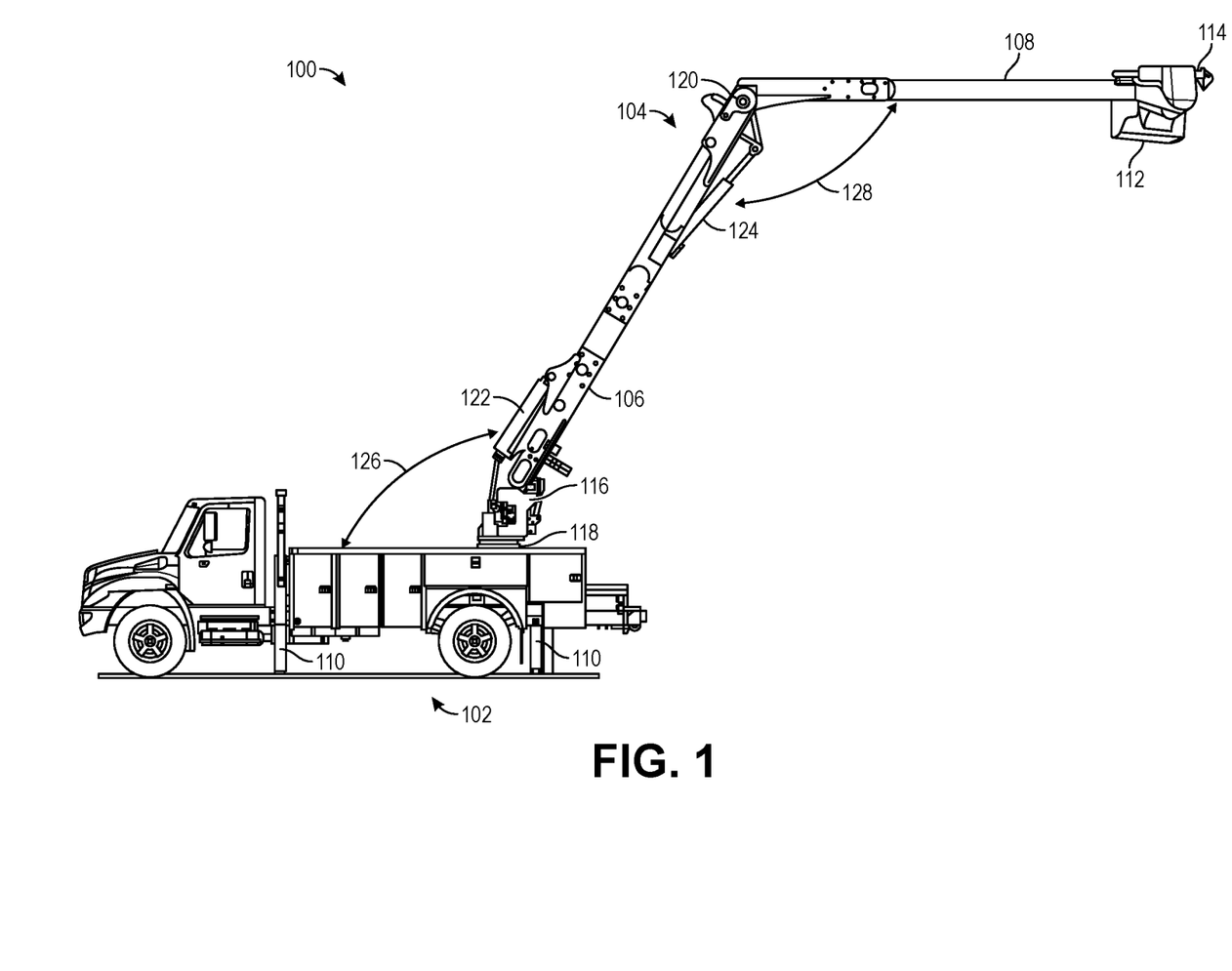
FIG. 1 is a schematic of a boom assembly with an aerial device relating to an exemplary embodiment of the invention.

Turning now to the figures, FIG. 1 shows a side view of an aerial device 100 comprising a distance measuring system. Similar components illustrated in different figures are enumerated with like numerals and may include alternative embodiments.

The aerial device 100 may include some sort of base that supports an extendable member configured for reaching (e.g., a boom 104). In the embodiment depicted in FIG. 1, the base 102 is a utility truck. In some embodiments, the base 102 may be a crane, a derrick digger, or any other base including an extendable member. In some embodiments, the boom 104 provides an extendable member for moving a platform 112. In some embodiments, the boom 104 may include a lower boom 106 and an upper boom 108. The base 102 provides a stable support, which may include outriggers 110, for supporting a load applied to the boom 104 and/or the platform 112. In an embodiment, the platform 112 includes a jib 114 configured for securing objects thereto. In some embodiments, the platform 112 may rotate to alter its orientation with respect to the boom 104. The boom 104 may fold into a collapsed position, which enables transporting via a mobile version of the base 102.

The boom 104 is mechanically coupled to, and configured to support, the platform 112. The optional platform 112 may be located at the distal end (with respect to the mobile base 102) of the upper boom 108. The upper boom 108 may include an optional telescoping arm (not shown) that extends from, and retracts within, the upper boom 108. The lower boom 106 may be mechanically coupled to a turntable 116 configured for rotating the boom 104. A pedestal 118 may be included to support the turntable 116 and is mechanically coupled to the base 102.

In operation, the platform 112 is raised by a combination of the lower boom 106 pivoting upwards, the upper boom 108 pivoting about an elbow 120, and the telescoping arm optionally extending out of the upper boom 108.

In an embodiment, the platform 112 is configured for hoisting a user into the air to, for example, work on a powerline. Prior to extending the boom 104, the base 102 may be moved to an appropriate location and stabilized. The boom 104 may be rotated about the turntable 116 and extended upwards and outwards away from the base 102 by pivoting the lower boom 106, the upper boom 108, and by extending the telescoping arm. Various combinations of these movements may be employed to position the platform 112 around base 102. In some embodiments, movement of the platform 112 may be operated by a user located on the platform 112. In some embodiments, operation of the platform 112 may be controlled by an operator not located on platform 112 (e.g., on the ground). In both cases, the user may not be able to see all aspects of the moving portions of the boom 104 (e.g., lower boom 106, upper boom 108, elbow 120, etc.).

In certain embodiments, the upper boom 108 and any telescoping arm that may extend from upper boom 108 are electrically conducting. In these embodiments, the aerial device 100 may be configured to operate on certain objects which lack high voltage danger (e.g., low voltage telecommunication cables, tree cutting, etc.). In certain embodiments, the upper boom 108 and any telescoping arm that may extend from the upper boom 108 are electrically insulating (e.g., fiberglass) to enable safe operation near electrical power lines. Such an insulating composition may, in embodiments, be configured to protect a user within platform 112 or an operator near base 102 from an energized scenario in which a portion of boom 104 comes in contact or close proximity with a portion of a high voltage system and may be configured to function in both a non-insulated boom 104 and an insulated boom.

Aerial device 100 may include a first boom hydraulic cylinder 122 and a second boom hydraulic cylinder 124 configured to move certain components of boom 104. For example, first boom hydraulic cylinder 122 may be configured to move lower boom 106 around lower boom joint angle 126. In some embodiments, second boom hydraulic cylinder 124 may be configured to move upper boom 108 around upper boom joint angle 128.

Figure 2:
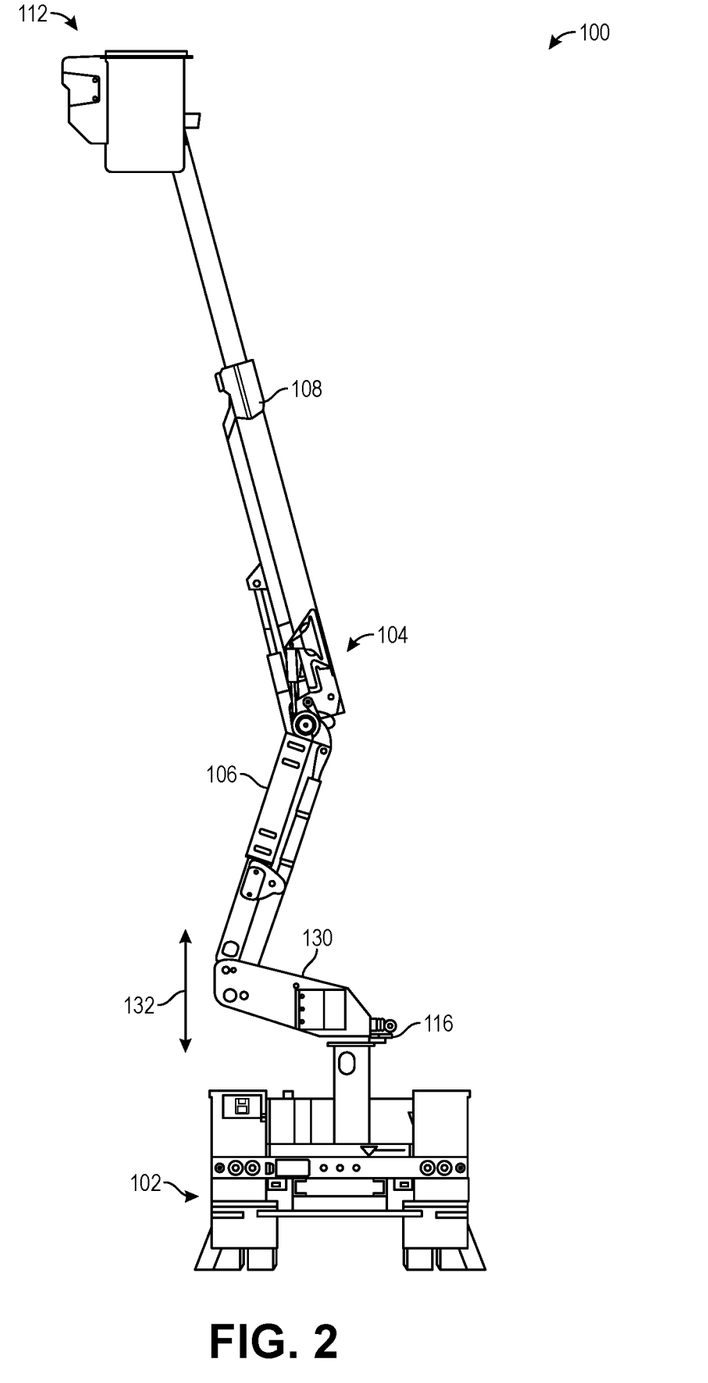
FIG. 2 is a rear view of a boom assembly relating to an exemplary embodiment of the invention.

As depicted in FIG. 2, in some embodiments, aerial device 100 may include an elevator 130. In some embodiments, elevator 130 may be disposed between base 102 and lower boom 106. In some embodiments, elevator 130 may be configured to raise or lower boom 106 in a substantially vertical direction (e.g., direction 132).

Figure 3:
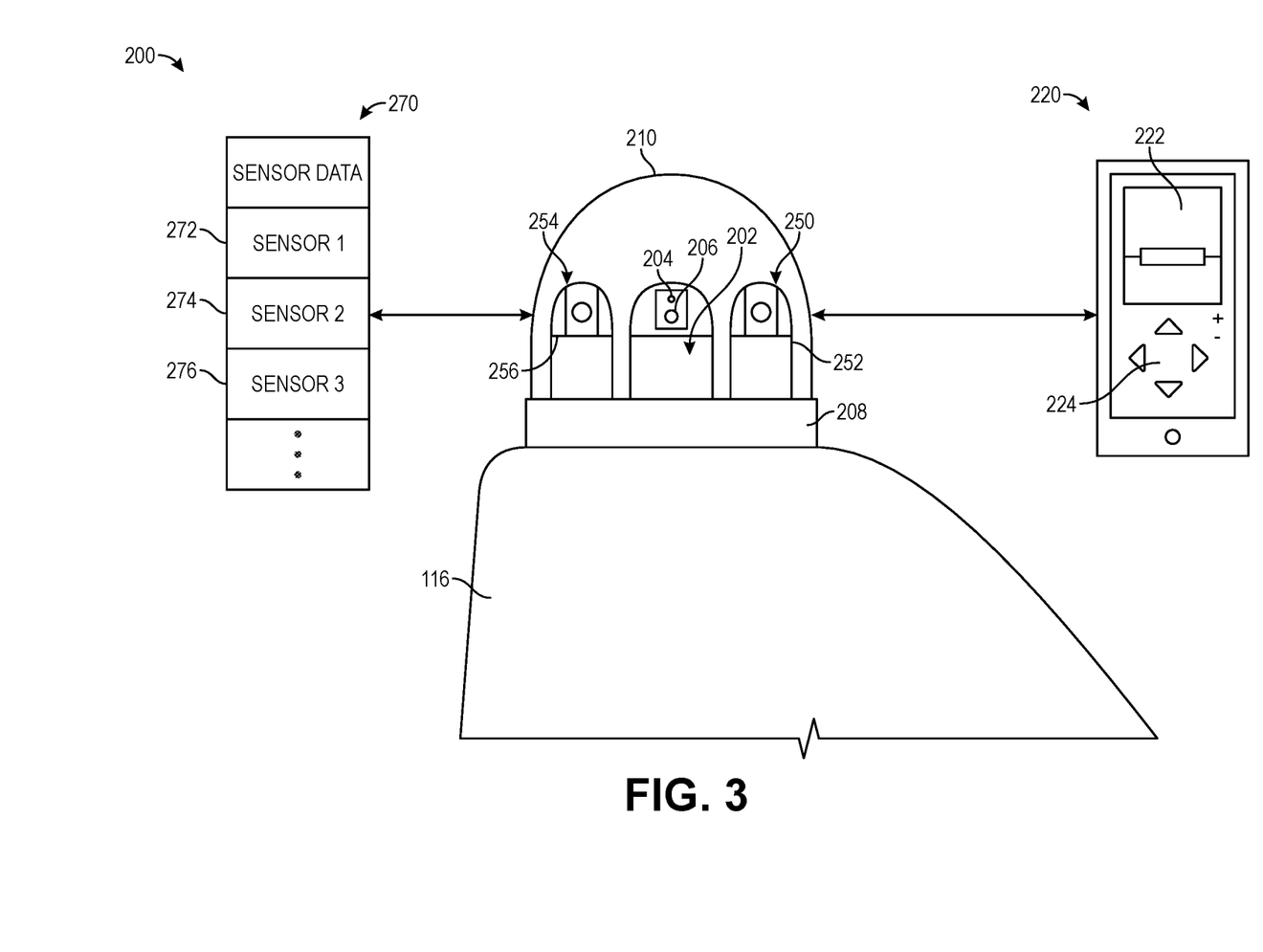
FIG. 3 shows a distance measuring system relating to an exemplary embodiment of the invention.

Turning now to FIG. 3, an exemplary distance measuring system is depicted and referred to with reference numeral 200. In some embodiments, distance measuring system 200 may comprise a laser targeting probe 202 comprising an emitter 204 for the emitting of a laser or other light to measure the distance from laser targeting probe 202 to a target. Emitter 204 of laser targeting probe 202 may be any currently known or yet to be discovered laser or other light emitting device for emitting a wavelength of light and recording the distance between the light emitting device and a target object. In alternative embodiments, laser targeting probe may be replaced with other distance measuring technology, including for example distance measuring cameras or other devices for measuring the distance between two objects. To aid in the positioning and locating of targets for distance measuring, laser targeting probe 202 may be paired with an imaging aid, such as a camera 206. Camera 206, when paired with a controller or other means of control, may be used to provide an image on a display, aiding the user or operator in positioning laser targeting probe 202 for directing the laser emitted from emitter 204 to the target. Further, laser targeting probe 202 may be coupled with a motorized turntable 208, which may rotate laser targeting probe 202 in a 360-degree fashion, allowing laser targeting probe 202 to measure the distance of targets in a variety of positions. Motorized turntable 208 may further comprise additional maneuverability, allowing laser targeting probe 202 to swivel up and down, allowing laser targeting probe 202 to measure the distance of targets in varying heights. As described in greater detail below, the movement of laser targeting probe 202 may be controlled through the use of a controller, including for example manual controls such as a joystick or through commands entered through a display of a client device such as a smartphone or tablet. In some embodiments, laser targeting probe 202 may be disposed on the base 102 of aerial device 100. For example, the laser targeting probe 202 may be disposed on the turntable 116 of aerial device 100. In some embodiments, the laser targeting probe 202 may be disposed on the boom 104 of aerial device 100. In some embodiments, the laser targeting probe 202 may be disposed on the platform 112 of aerial device 100. In some embodiments, there may be more than one laser targeting probe 202 disposed on aerial device 100. In these embodiments, the more than one laser targeting probes 202 may be operatively connected for communication therebetween. In further embodiments, laser targeting probe 202 may be configured as a hand-held device or device mounted on a tripod, rather than located on aerial device 100. For example, in some applications an intended target may not be visible from aerial device 100, such as a target on the roof of a building.

To protect laser targeting probe 202, distance measuring system 200 may optionally and additionally comprise protective housing 210. In some embodiments, protective housing 210 may be a dome, completely surrounding laser targeting probe 202. Further, to prevent interference with the laser emitted from emitter 204, protective housing 210 may be made from a clear or opaque material, providing for limited or no interference of the laser emitted from emitter 204. Further, protective housing 210 may be constructed from a variety of materials, including but not limited to safety glass, or other durable and clear material. In some embodiments, the dimensions of protective housing 210 may be greater than the dimensions of motorized turntable 208, such that protective housing 210 remains stationary as laser targeting probe 202 is moved. In further embodiments, protective housing 210 may be rotated by motorized turntable 208.

As further depicted by FIG. 3, distance measuring system 200 may be paired with at least one control system 220, providing an interface between a user or operator and at least laser targeting probe 202. As described in greater detail below, control system 220 may comprise a processor configured to receive the distance information captured by distance measuring system 200, among other data fields. Control system 220 may take the captured distance information and formulate a determination as to whether the aerial device 100 can reach the intended target. In some embodiments, control system 220 may be configured for receiving additional information, including for example, degree of incline, weight of platform 112, and other factors, to determine that in addition to whether aerial device 100 can reach the intended target, whether aerial device 100 can safely reach the intended target.

In some embodiments, control system 220 may comprise a display 222 and controls 224 for controlling at least the laser targeting probe 202, although other peripherals of distance measuring system 200 may be controlled using controls 224. For example, display 222 may be an LCD display screen, touch screen, or other visual display commonly associated with a computer or mobile device. Display 222 may also be coupled to camera 206 of laser target probe 202, providing a visual aid to a user or operator in controlling laser targeting probe 202. Display 222 may further be configured for displaying a generated determination of whether aerial device 100 can reach a target. The generated determination displayed on display 222 may be any of: a text-based message, a color-coded indication (e.g., green, yellow, or red), a binary indication (e.g., check-mark or "X"), or any other visual or audial indicator.

Further, controls 224 may be configured for controlling laser targeting probe 202 and for directing the laser emitted from emitter 204. For example, in some embodiments, display 222 may be the touch screen of a smart phone or tablet, and controls 224 may be located on the touch screen, including for example directional arrow keys or a virtual directional pad and/or virtual buttons. In further embodiments, controls 224 may be a separate apparatus coupled to display 222. For example, controls 224 may comprise a hand-held control stick, such as a joystick or sidestick controller and/or one or more buttons for manipulating the movement of laser targeting probe 202. Further, controls 224 may also comprise inputs for auxiliary aspects of controlling laser targeting probe 202 or other components of distance measuring system 200. For example, controls 224 may further comprise buttons or other inputs for controlling the magnification of camera 206, magnifying the image of the intended target and/or for activating emitter 204.

In some embodiments, control system 220 may be disposed on any portion of the aerial device 100, such as base 102 or platform 112. In some embodiments, the control system 220 may be disposed on the base 102 of aerial device 100. In some embodiments, the control system 220 may be disposed on the turntable 116 of aerial device 100. In some embodiments, the control system 220 may be disposed on the boom 104 of aerial device 100. In some embodiments, the control system 220 may be disposed on the platform 112 of aerial device 100. In some embodiments, there may be more than one control system 220 disposed on aerial device 100. In these embodiments, the more than one control system 220 may be operatively connected for communication therebetween.

In some embodiments, control system 220 may comprise a plurality of displays 222 and/or controls 224 in communication with control system 220, providing for operational flexibility. For example, in some embodiments, control system 220 may comprise a computer or other similar hardware integrated at the location of laser targeting probe 202 acting as display 222 with a connected joystick and buttons acting as controls 224. Additionally, a second display 222 may be located within the cab of base 102, providing the driver of base 102 with simultaneous notification of whether base 102 is in an operative position or if base 102 may need to be moved. It will be appreciated that any number of displays 222 and/or controls 224 may be used with control system 220, and that the number of displays 222 and/or controls is not intended to be a limiting feature.

Further, in some embodiments, in addition to measuring the distance between laser targeting probe 202 and a target, distance measuring system 200 may be configured with one or more additional accessories, peripheries, or components, which may provide additional functionality to distance measuring system 200. For example, in some embodiments, distance measuring system 200 may comprise at least one imaging camera 250, which may be configured for monitoring and recording the surroundings around aerial device 100. Imaging camera 250 may be mounted on a motorized turntable 252, similar to that of motorized turntable 208 paired with laser targeting probe 202. In some embodiments, imaging camera 250 may be rotatable along 360-degrees and may be used for capturing and recording the surrounding of aerial device 100. For example, through the processes outlined below, control system 220 may determine that the intended target is within the reach of aerial device 100. However, oftentimes aerial devices 100 must be used in residential areas and must navigate and operate near residential cars or other objects, including hazardous objects such as electrical boxes. Accordingly, in some embodiments, distance measuring system 200, through imaging camera 250, may observe and record the surroundings of aerial device 100, and such recordings may be used by control system 220 in generating a recommendation on whether it is advisable to extend platform 112 to the target. In some embodiments, imaging camera 250 may be located within protective housing 210 along with laser targeting probe 202. However, in alternate embodiments, imaging camera 250 may be located in other locations on aerial device 100. Imaging camera 250 may also be communicatively coupled with control system 220, such that the images and/or video recorded by imaging camera 250 may be uploaded or transferred to control system 220 for processing.

In some embodiments, distance measuring system 200 may additionally comprise at least a second imaging camera 254, to aid in capturing a 360-degree view of aerial device 100. For example, in some embodiments, there may be one or more blind spots in the 360-degrees surrounding aerial device 100, such that a single imaging camera 250 cannot capture a 360-degree capture of the area surrounding aerial device 100. Additionally, even in embodiments in which there are no blind-spots, it may be advantageous to have simultaneous captures of the area around aerial device 100. Accordingly, distance measuring system 200 may comprise at least a second imaging camera 254. In some embodiments, second imaging camera 254 may comprise a motorized turntable 256, similar to motorized turntable 252 and 208 as described above. Furthermore, second imaging camera 254 may be located within protective housing 210 along with laser targeting probe 202 and imaging camera 250. However, in alternate embodiments, second imaging camera 254 may be located in other locations on aerial device 100 and/or base 102. Like imaging camera 250, second imaging camera 254 may also be communicatively coupled with control system 220, such that the images and/or video recorded by second imaging camera 254 may be uploaded or transferred to control system 220 for storage and processing.

In some embodiments, and using the processes as described below, control system 220 may process captured distance information captured by laser targeting probe 202 and make a determination as to whether aerial device 100 may not only reach the intended target, but whether aerial device 100 can safely reach the target. To calculate this determination, control system 220 may utilize sensor data 270 captured from one or more sensors that are attached, connected, or otherwise coupled to aerial device 100. For example, in some embodiments, sensor data 270 may be captured from one or more sensors, including sensors 272, 274, and 276, respectively. However, it will be appreciated that any number of sensors may be incorporated with aerial device 100 and/or control system 220.

As described above, oftentimes, aerial devices 100 and particularly bases 102 may be parked or must operate from inclined, elevated, or sloped streets or surfaces, which may affect the operative distance from aerial device 100 to the intended target. For example, on a flat surface, devoid of a slope or angle, the distance between aerial device 100 and the intended target may be shorter in distance than when aerial device 100 is parked on a slope of about −15-degrees. Accordingly, to account for variation in distances caused by slopes or elevations, aerial device 100 may comprise at least one inclinometer 272. In some embodiments, the inclinometer 272 may be disposed on various positions on aerial device 100. Further, inclinometer 272 may be configured for either direct, or indirect communication with control system 220, for providing the information captured by inclinometer 272. In some embodiments, control system 220 may call out to inclinometer 272 in response to a prompt or command. In some embodiments, inclinometer 272 may provide information to control system 220 at continuous, regular, and/or scheduled intervals.

In some embodiments, aerial device 100 may comprise a variety of platforms 112 or other attachments, some of which may be quite heavy. Accordingly, the angle of boom 104 in addition to the weight of the attachment may be a safety consideration, factored by control system 220. For example, in addition to inclinometer 272, aerial device 100 may comprise a weight sensor 274, which can measure and record the weight of the platform 112 or other attachment to aerial device 100. For example, in some embodiments, the attachment may be a heavy aerial, adapted or used for transporting heavy machinery to a work location. Accordingly, when control system 220 is determining whether aerial device 100 may safely reach an intended target, the weight of the attachment may be factored in the analysis. For example, if the intended target is within the range of boom 104, but requires complete extension of boom 104, the angle of boom 104 combined with the weight of the attachment may cause extreme or excessive strain on boom 104. In some embodiments, there may be a threshold at which the weight of the attachment combined with the extension and extension angle of boom 104 may be determined by control system 220 to be unsafe or unadvisable for aerial device 100 to extend to the intended target. Similar to inclinometer 272 as described above, in some embodiments, the weight sensor 274 may be disposed on various positions on aerial device 100. Further, weight sensor 274 may be configured for either direct, or indirect communication with control system 220, for providing the information captured by weight sensor 274. In some embodiments, control system 220 may call out to weight sensor 274 in response to a prompt or command. In some embodiments, weight sensor 274 may provide information to control system 220 at continuous, regular, and/or scheduled intervals.

In the field, equipment and machinery is oftentimes exposed to general wear and tear through use or exposure to inclement weather. Further, telecommunications lines or other above ground utility installations can be rendered inoperable during severe weather, such as through large gusts of wind. Accordingly, aerial device 100 may comprise at least a third sensor 276 for recording additional sensor data 270. By way of non-limiting example, in some embodiments third sensor 276 may be a diagnostic sensor, configured for monitoring the status of the mechanical and/or electrical components of aerial device 100. In some embodiments, third sensor 276 may be a sensor or device for detecting wind speed. For example, during extension, aerial device 100 may be exposed to dangerous wind speeds, providing for a risk that aerial device 100 may be tipped over if boom 104 is extended beyond a certain threshold. It will be appreciated that third sensor 276 may be any sensor or device configured for providing information to control system 220 to determine whether aerial device 100 may reach the intended target safely and/or once aerial device 100 has reached the intended target, the aerial device 100 is safe. By way of non-limiting example, third sensor 276 may be any of: a temperature sensor, a pressure sensor, a humidity sensor, a fluid sensor, or other sensor for recording diagnostic or other information for aiding in determining whether aerial device 100 can safely reach an intended target. It will be further appreciated that in some embodiments, aerial device 100 may include more than the three sensors as depicted in FIG. 3 and may comprise any number of sensors for recording sensor data 270. As described above with respect to inclinometer 272 and weight sensor 274, third sensor 276 may also be configured to be disposed on various positions on aerial device 100. Further, third sensor 274 may also be configured for either direct, or indirect communication with control system 220, for providing the information captured by third sensor 276 to control system 220. In some embodiments, control system 220 may call out to third sensor 276 in response to a prompt or command. In some embodiments, third sensor 276 may provide information to control system 220 at continuous, regular, and/or scheduled intervals.

Figure 4:
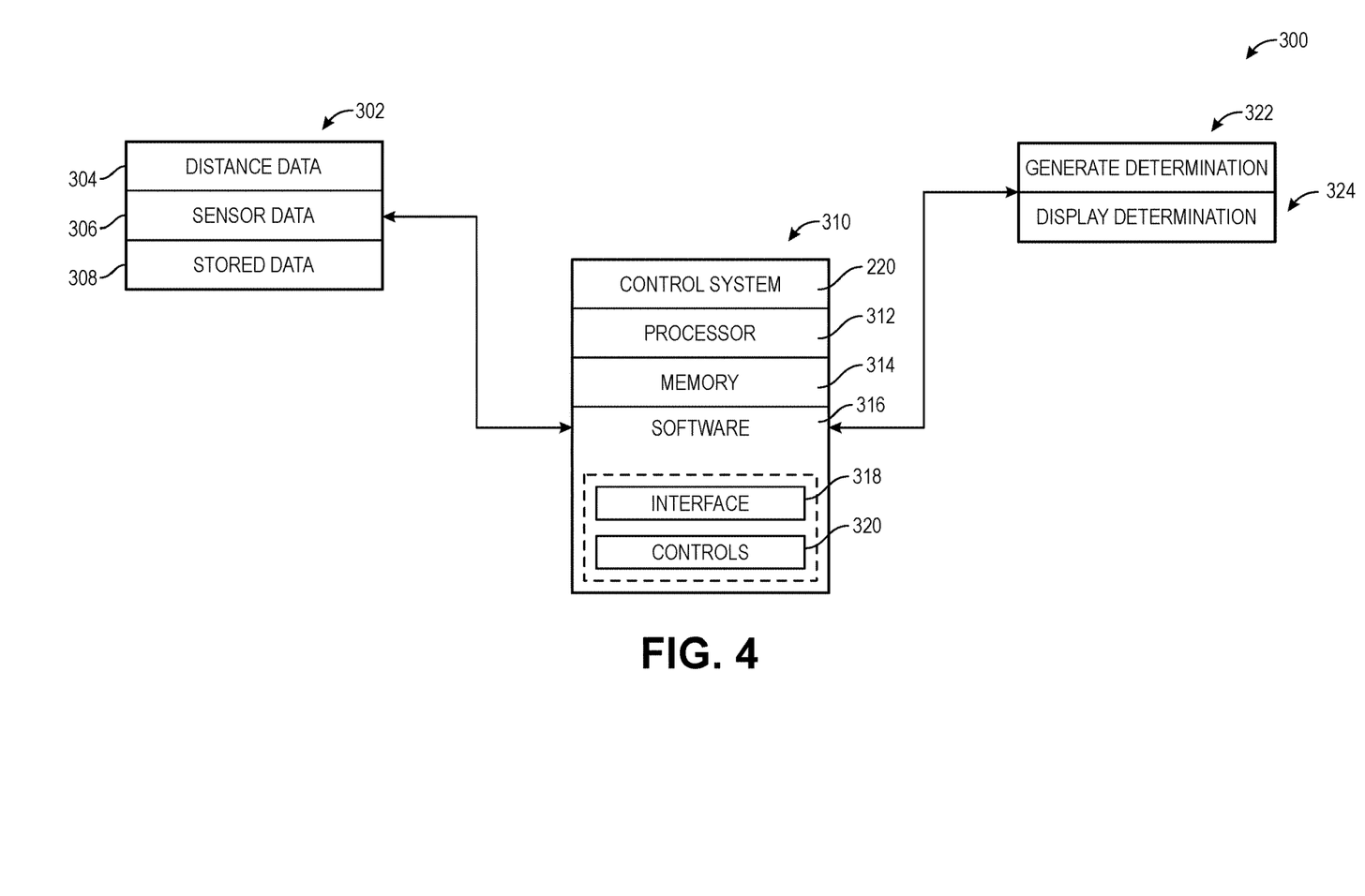
FIG. 4 is a system diagram of a distance measuring system relating to an exemplary embodiment of the invention.

Turning now to FIG. 4, an exemplary system diagram comprising control system 220 is depicted as reference numeral 300. In some embodiments, a determination system 310 may comprise control system 220, which is for example a computer, microcontroller, microprocessor, or programmable logic controller (PLC) having a processor 312, a memory 314, and non-transitory computer-readable medium for storing software 316, with processor 312 configured for executing instructions of the software 316. Additionally, software 316 may also comprise instructions for displaying information on an interface 318 as well as instructions for receiving commands from controls 320. In some embodiments, interface 318 may be display 222 and controls 320 may be controls 224 as described above with respect to FIG. 3. As further depicted in FIG. 4 and as described above, control system 220 may be configured for receiving one or more data points 302 and use the received data points 302 for generating a determination as to whether a platform 112 of aerial device 100 can reach an intended target.

As depicted, in some embodiments data points 302 may comprise multiple points of data and information, providing different fields for which control system 220 may process and factor in generating the determination. For example, in some embodiments, data points 302 may comprise distance data 304, which may be collected or recorded by laser targeting probe 202 of distance measuring system 200. For example, a laser emitted from emitter 204 may be directed to an intended target, for measuring the distance between laser targeting probe 202 and the intended target. The method of using laser targeting probe 202 to acquire distance data 304 may be conducted using the methods described above. Upon collecting distance data 304, the distance data 304 may be transmitted or otherwise sent to control system 220.

Optionally or additionally, in some embodiments data points 302 may also comprise sensor data 306. For example, in some embodiments, data points 302 may comprise sensor data 306, which may be data collected or recorded by one or more sensors. For example, sensor data 306 may include data collected by inclinometer 272, weight sensor 274, third sensor 276, and/or any other sensors coupled to or used with aerial device 100. Sensor data 306 collected or recorded may be transmitted or otherwise sent to control system 220.

Optionally or additionally, in some embodiments, data points 302 may also comprise stored data 308, which may be information stored on a dedicated memory, such as a database server or other memory, which may be sent or uploaded to control system 220. For example, aerial device 100 may be outfitted with varying sizes of booms 104, different styles of booms 104, different size or style platforms 112, or may replace platform 112 with alternate attachments, such as a derrick digger or auger. A such, the effective range of one embodiment of aerial device 100 may not be equivalent to another embodiment of aerial device 100, and while a first embodiment of aerial device 100 may reach an intended target at sixty feet, a second embodiments may not. Accordingly, control system 220 may call out to a memory storing stored data 308 and receive information about a particular aerial device 100. In some embodiments, stored data 308 may instead be stored in memory 314 of control system 220.

Upon receipt of data points 302, control system 310 may take the information and generate and display a determination 322 as to whether aerial device 100 can reach the intended target. For example, control system 220 may take distance data 304 and combine the distance data 304 with stored data 308 and determine whether the embodiment of aerial device 100 can reach the intended target. Through such combining of data points 302, control system may account for varying extension lengths of different booms 104 that may be attached to base 102. Further, in addition to determining whether aerial device 100 can reach the intended target, control system 220 may use sensor data 306 to determine whether aerial device 100 can safely reach the intended target. For example, in some embodiments, control system 220 may determine that based on the angle of boom 104 combined with the weight of platform 112, there may be an increased risk of damage to boom 104.

Finally, after generating the determination, control system 220 may display the determination. In some embodiments, the determination 324 may be displayed on display 222. In some embodiments, the level of detail of the determination that is displayed can vary. For example, in some embodiments, the determination may be displayed as a binary output, such as a simple "yes" or "no." In some embodiments, the determination may be displayed with increased details or text, providing a user or operator with additional information in addition to whether the aerial device 100 is in a position to reach the intended target. For example, if the control system 220 determines that aerial device 100 is three feet away from an effective location to reach the intended target, the control system 220 may provide a recommendation to the operator to move aerial device 100 at least three feet closer to the intended target. Additionally, the recommendation may also provide operation recommendation to the operator. For example, control system 220 may determine that the aerial device 100 can reach the intended target, but the angle at with boom 104 must extend would limit maneuverability of platform 112 during operation. Accordingly, control system 220 may display a recommendation to the operator that while aerial device 100 is in a location to reach the intended target, that aerial device 100 should move away a certain distance. Further, control system 220 may display a recommendation to the operator that while aerial device 100 is in a location to reach the intended target, it would be inadvisable to do so. For example, if the weight of platform 112 causes excess strain to boom 104 as a result of the boom 104 angle, a recommendation may be displayed that advises against extending platform 112 to the target and a description as to why.

Figure 5:
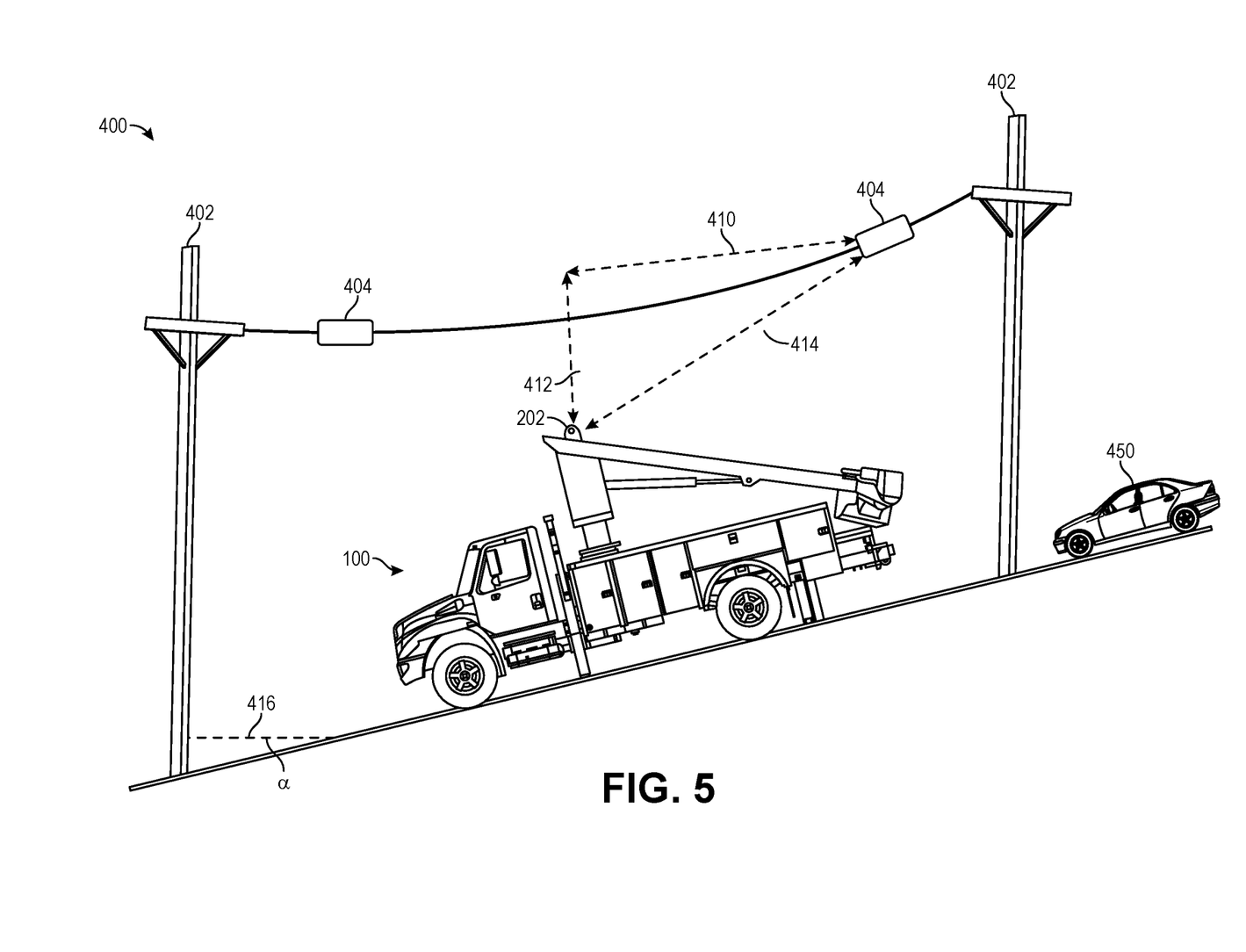
FIG. 5 shows an aerial device using a distance measuring system relating to an exemplary embodiment of the invention.

Turning now to FIG. 5, an exemplary embodiment of aerial device 100 in use is shown and depicted through reference numeral 400. As depicted, an aerial device 100 may arrive at a job site to perform maintenance or other work on an intended target. For example, aerial device 100 may arrive at a site between two telecommunication poles 402 with at least one telecommunication node 404 disposed between the two telecommunication poles 402 and suspended on a power line. Upon arriving at the location, aerial device 100 may be stopped and parked, or at least slowed down, at an initial location that an operator believes is in a position so that aerial device 100 may reach an intended target. Upon stopping or slowing down, an operator may activate laser targeting probe 202 of distance measuring system 200 to target or "laze" one or more targets to determine whether aerial device 100 may reach the target. Upon activation, the operator may direct laser targeting probe 202 towards the intended target using camera 206 and controls 224 of control system 220. When the intended target is in line with laser targeting probe 202, the operator may activate emitter 204 and transmit a laser towards the intended target, such as telecommunications node 404, for example, and determine the distance from laser targeting probe 202. In some embodiments, once the intended target has been "lazed", control system 220 may calculate the range to the target and whether platform 112 of aerial device 100 can reach the target. For example, upon "lazing" the intended target, the control system 220 may be provided with the measured distances from laser targeting probe 202 to the intended target. For example, the measured distance may include an X-distance 410, which may be the horizontal distance from laser targeting probe 202 and a Y-distance 412, which may be the vertical distance. The measured distance may also comprise a Z-distance 414, which may be a straight-line distance from laser targeting probe 202 to the intended target. Additionally, control system 220 may also factor in a slope or angle that aerial device 100 is located upon, such as a-angle 416. Once the distances are measured, control system 220 may use the measured distances to generate a determination as to whether aerial device 100 is in a position to reach the intended target. The determination may be generated using the methods provided above.

Once the distance to the target has been determined, control system 220 may provide to the operator a generated recommendation and/or determination as to whether aerial device 100 may reach the target in its current position. For example, control system 220 may display the determination on display 222. In some embodiments, and as described above, control system 220 may further display additional information, including for example if aerial device 100 may not reach the target, a recommendation to move base 102 a certain distance. Upon receipt of the determination or recommendation, the operator may then extend aerial device 100 to the intended target or move base 102 to another location.

Oftentimes, telecommunication lines and other utility systems comprise multiple points that require maintenance and upkeep. For example, in some embodiments, aerial device 100 may be used for reaching and repairing multiple telecommunication nodes disposed between two telecommunication towers, such as in the depicted embodiments of FIG. 5. Traditionally, an operator would have to estimate a position between the two nodes 404, and hope that aerial device 100 could reach both nodes 404 without having to bring platform 112 down and relocate base 102. Accordingly, in some embodiments, distance measuring system 200 may be used to determine the distance of multiple targets and determine whether platform 112 can reach both intended targets without moving base 102. For example, as depicted in FIG. 5, aerial device 100 may be parked or stopped at an initial position between two telecommunication nodes 404. An operator, using the methods described above, may laze two or more telecommunication nodes 404 that require maintenance or work. Using the captured data, control system 220 may determine whether aerial device 100 at its current position, would be able to reach both telecommunication nodes 404 without moving and provide the determination to the operator.

In another application, aerial device 100 may be used similarly to describes above for electric utility maintenance work, and the site may include poles supporting high voltage power lines, transformers, cross bars, insulators, etc.

Optionally or additionally, distance measuring system 200 may monitor the area around aerial device 100, which in turn may contribute to the generated recommendation or determination. For example, as described above, operators or utility workers may work in residential areas with residential cars near a worksite, or other objects that may be hazardous or accounted for. Imaging camera 250 of distance measuring system 200 may be used to capture and record parked vehicles or other objects, such as residential vehicle 450, and factor these objects into whether aerial device 100 can safely reach the intended target. For example, aerial device 100 may be maneuvered next to a residential vehicle 450, and residential vehicle 450 may be located below the path that platform 112 must travel when extending towards the intended target. This may pose collateral damage issues, such as falling tools hitting residential vehicle 450, or other concerns. Accordingly, control system 220 may factor in the recordings captured by imaging camera 250 and generate a recommendation that aerial device 100 should move to a different location to avoid objects such as residential vehicle 450. Further, control system 220 may continuously monitor the area around aerial device 100 after platform 112 has been extended. For example, after platform 112 has been extended and workers are working on telecommunication node 404, a previously absent residential vehicle 450 may park next to aerial device 100 and below platform 112. Control system 220 may identify residential vehicle 450 and provide a message or warning to the workers on aerial device 100 and/or platform 112 about the location of residential vehicle 450.

Figure 6:
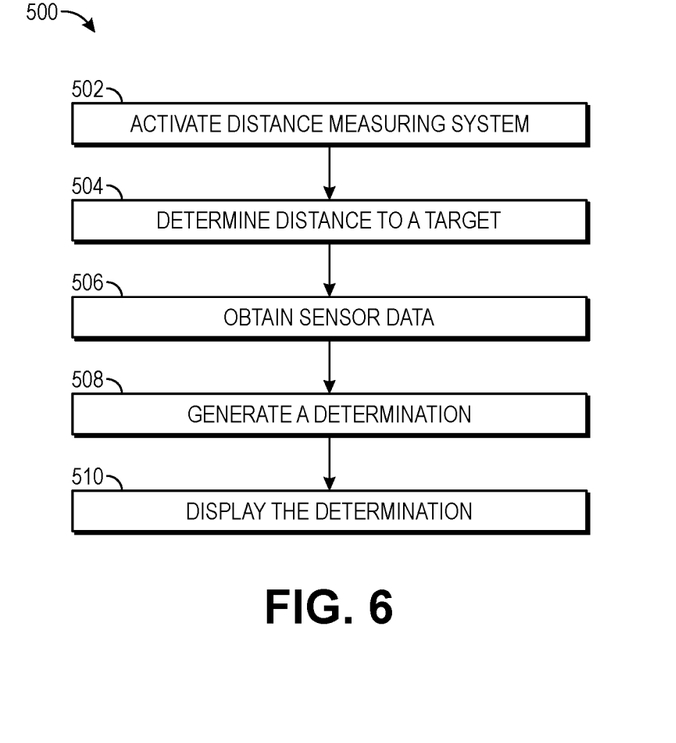
FIG. 6 is a flow chart depicting an exemplary method of using a distance measuring system relating to some embodiments of the invention.

FIG. 6 depicts an exemplary flowchart depicting a method of use of the present invention depicted with reference numeral 500. A first step 502 of method 500 may include the activation of distance measuring system 200 for the measuring of the distance between aerial device 100 and an intended target. For example, upon parking or stopping aerial device 100, but prior to the extension of platform 112, an operator or worker may activate the laser targeting probe 202 of distance measuring system 200. In some embodiments, laser targeting probe 202 may be activated through control system 220, such as through a power button on display 222.

Next, at step 504, distance measuring system 200 may determine the distance to an intended target. In some embodiments, an operator or worker may control or navigate the positioning of laser targeting probe 202 through controls 224 of control system 220 and camera 206 of laser targeting probe 202. For example, camera 206 may provide an image of what laser targeting probe 202 is directed towards and display the image on display 222. The operator or worker provided with the image on display 222, may then manipulate the positioning of laser targeting probe 202 through commands entered using controls 224. The operator or worker may then direct and point laser targeting probe 202 towards the intended target. Once the intended target is lined up with laser targeting probe 202, a laser may be emitted from emitter 204 towards the intended target and the distance from laser targeting probe 202 to the intended target may be determined.

At an optional step 506, control system 220 may be provided with sensor data 270 collected from one or more sensors 272, 274, 276 located on aerial device 100. For example, one sensor located on aerial device 100 may be an inclinometer 272, configured for recording the slope or degree of angle that aerial device 100 is located on. For example, aerial device 100 may be parked on a hill, comprising a slope of about 15-degrees. The inclinometer 272 may record the slope of the hill, which may or may not affect whether platform 112 may reach the intended target. However, the information captured by inclinometer 272 may nevertheless be recorded and used by control system 220 in generating its determination. Further, during step 506, control system 220 may be provided with any additional sensor information collected by sensors located on or in communication with aerial device 100, including in the manners described above.

Next, at step 508, control system 220, provided with distance information and optional sensor data, may generate a determination as to whether platform 112 may reach the intended target. During step 508, control system 220 may combine the obtained distance information and optional sensor data with information about aerial device 100 stored or otherwise transmitted to control system 220. For example, oftentimes aerial devices 100 may be outfitted with booms 104 of varying lengths, extension capabilities, and extension methods. For example, in some embodiments aerial device 100 may comprise a telescopic boom having a reach of forty feet. In some embodiments, aerial device 100 may comprise an overcenter or non-overcenter boom, in which a two-portion boom extends at a hitch with a reach of sixty feet. With all the information provided, control system 220 may generate a determination as to whether platform 112 may extend and reach the intended target.

Finally, at step 510, the generated determination may be displayed to an operator or worker through display 222 of control system 220. In some embodiments, the generated determination may be displayed as an output using any of the manners described above, including for example, as a binary determination, a descriptive determination, or a descriptive determination with recommendations. Upon receipt of the determination, the operator or worker may then either move aerial device 100 to a new location or extend platform 112 knowing that platform 112 can safely reach the intended target.

Figure 7:
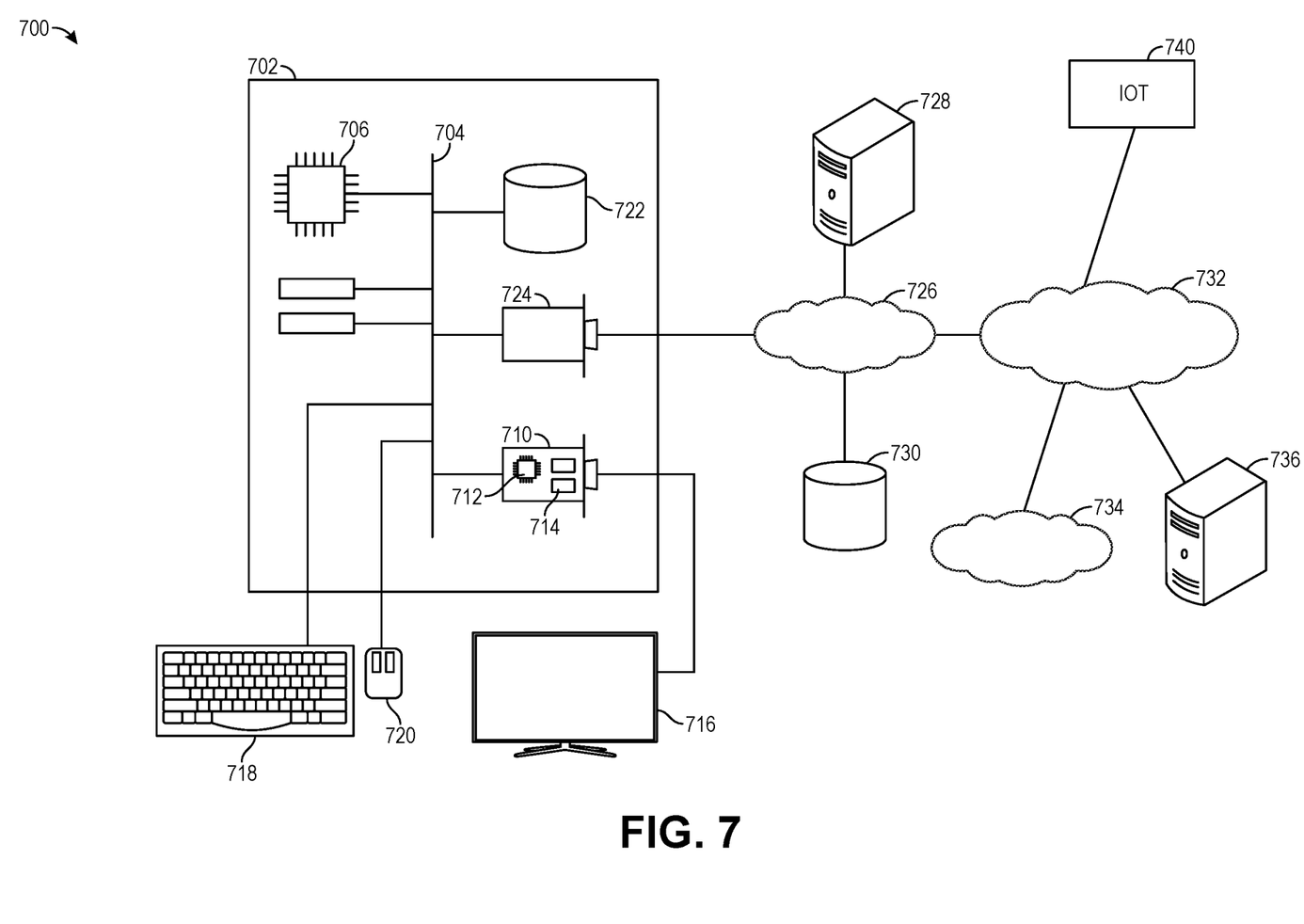
FIG. 7 depicts an exemplary hardware platform for some embodiments of the invention.

Turning to FIG. 7, an exemplary hardware platform 700 for certain embodiments of the invention is depicted. Computer 702 can be a desktop computer, a laptop computer, a server computer, a mobile device such as a smartphone or tablet. Depicted with computer 702 are several components, for illustrative purposes. In some embodiments, certain components may be arranged differently or absent. Additional components may also be present. Included in computer 702 is system bus 704, whereby other components of computer 702 can communicate with each other. In certain embodiments, there may be multiple busses or components may communicate with each other directly. Connected to system bus 704 is central processing unit (CPU) 706. Also attached to system bus 704 are one or more random-access memory (RAM) modules 708. Also attached to system bus 704 is graphics card 710. In some embodiments, graphics card 710 may not be a physically separate card, but rather may be integrated into the motherboard or the CPU 706. In some embodiments, graphics card 710 has a separate graphics-processing unit (GPU) 712, which can be used for graphics processing or for general purpose computing (GPGPU). Also on graphics card 710 is GPU memory 714. Connected (directly or indirectly) to graphics card 710 is display 716 for user interaction. In some embodiments no display is present, while in others it is integrated into computer 702. Similarly, peripherals such as keyboard 718 and mouse 720 are connected to system bus 704. Like display 716, these peripherals may be integrated into computer 702 or absent. Also connected to system bus 704 is local storage 722, which may be any form of computer-readable media, and may be internally installed in computer 702 or externally and removably attached.

Computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-usable instructions, data structures, program modules, and other data representations.

Finally, network interface card (NIC) 724 is also attached to system bus 704 and allows computer 702 to communicate over a network such as network 726. NIC 724 can be any form of network interface known in the art, such as Ethernet, ATM, fiber, BLUETOOTH, or Wi-Fi (i.e., the IEEE 802.11 family of standards). NIC 724 connects computer 702 to local network 726, which may also include one or more other computers, such as computer 728, and network storage, such as data store 730. Generally, a data store such as data store 730 may be any repository from which information can be stored and retrieved as needed. Examples of data stores include relational or object-oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer such as computer 728, accessible on a local network such as local network 726, or remotely accessible over Internet 732. Local network 726 is in turn connected to Internet 732, which connects many networks such as local network 726, remote network 734 or directly attached computers such as computer 736, or to IOT 740, such as internet connected devices, appliances, equipment, tools, or other objects. In some embodiments, computer 702 can itself be directly connected to Internet 732.

In some embodiments of the invention, the computer executable program may be stored on the local storage of the computer 702. The computer 702 may be operable to communicate with the control system 220. In some embodiments, display 222 may be the display 716, which may be attached to the platform 112, positioned on base 102, or as a free-standing device, among other embodiments. In some embodiments, the computer 702 may utilize either the local network 726 or the internet 732 to communicate a signal indicative of the condition of at least one of the conductive components.

Although the invention has been described with reference to the embodiments illustrated in the attached drawing figures, it is noted that equivalents may be employed, and substitutions made herein without departing from the scope of the invention as recited in the claims.

Having thus described various embodiments of the invention, what is claimed as new and desired to be protected by Letters Patent includes the following:

1. An aerial device, comprising:
   a base;
   a boom operatively attached to the base at a first end;
   a platform attached to the boom at a first end;
   a distance measuring system operatively coupled to at least one of the base, the boom, or the platform, comprising a laser targeting probe; and
   a control system operatively coupled to the distance measuring system, comprising:
   a display; and
   a controller for inputting a command to manipulate the laser targeting probe.

2. The aerial device of claim 1, further comprising a protective housing surrounding the laser targeting probe.

3. The aerial device of claim 2, wherein the laser targeting probe comprises an emitter for emitting a laser.

4. The aerial device of claim 3, wherein the laser targeting probe comprises a camera for capturing an image.

5. The aerial device of claim 4, wherein the image captured by the camera is configured to be displayed via the display.

6. The aerial device of claim 5, wherein the laser targeting probe further comprises a motorized turntable.

7. The aerial device of claim 6, wherein the motorized turntable is configured to respond to the command from the control system.

8. A system for measuring a distance between an intended target and an aerial device, the system comprising:
   an aerial device comprising: a base, a boom operatively attached to the base at a first end, and a platform mechanically attached to the boom at a second end;
   a distance measuring system comprising: a laser targeting probe, a protective housing, and a control system,
   wherein the laser targeting probe comprises a laser emitter and a camera,
   wherein the control system is configured to control an orientation of laser targeting probe through an image captured by the camera.

9. The system of claim 8, further comprising at least one first sensor configured for recording sensor data and sending the sensor data to the control system.

10. The system of claim 9, wherein the at least one first sensor is an inclinometer.

11. The system of claim 10, further comprising at least one second sensor, wherein the at least one second sensor is a weight measuring sensor.

12. The system of claim 8, further comprising at least one imaging camera operatively coupled to at least one of the base, the boom, or the platform.

13. The system of claim 12, wherein the at least one imaging camera is configured for recording an image of an area around the aerial device.

14. The system of claim 13, wherein the control system is configured to receive the image recorded by the at least one imaging camera.

15. A method of determining a distance between an aerial device and an intended target, the method comprising:
- positioning an aerial device comprising a base, an extendable boom having a platform, and a distance measuring system in a first position;
- identifying a first intended target and activating the distance measuring system;
- determining a distance between the first intended target and the platform;
- generating a determination on whether the platform can reach the first intended target; and
- displaying the determination on a display of the distance measuring system.

16. The method of claim 15, further comprising identifying a second intended target and determining the distance between the second intended target and the platform.

17. The method of claim 16, further comprising generating a determination on whether the platform can reach both the first intended target and the second intended target without repositioning the aerial device.

18. The method of claim 15, further comprising receiving sensor data from one or more sensors in communication with the distance measuring system.

19. The method of claim 18, wherein the one or more sensors comprise an inclinometer or a weight sensor, and further comprising recording the sensor data and sending the sensor data to the control system.

20. The method of claim 15, further comprising monitoring an area around the aerial device via one or more imaging cameras in communication with the distance measuring system.

* * * * *